United States Patent [19]

Kayser

[11] 3,945,203

[45] Mar. 23, 1976

[54] LIQUID-FUELED ROCKET

[76] Inventor: Lutz Tilo Kayser, Am Bismarckturm 10, D-7 Stuttgart 1, Germany

[22] Filed: Oct. 4, 1973

[21] Appl. No.: 403,607

[30] Foreign Application Priority Data

Oct. 6, 1972 Germany............................ 2249081

[52] U.S. Cl. ................. 60/259; 60/39.48; 417/120
[51] Int. Cl.[2] .......................................... F02K 9/02
[58] Field of Search ....... 60/39.48, 259, 39.14, 204; 417/120

[56] References Cited
UNITED STATES PATENTS

| | | | |
|---|---|---|---|
| 2,402,826 | 6/1946 | Lubbock ............................. | 60/39.48 |
| 2,711,630 | 6/1955 | Lehman ............................. | 60/39.48 |
| 2,874,539 | 2/1959 | Fox .................................. | 60/39.48 X |
| 2,986,004 | 5/1961 | McKenney ......................... | 60/39.48 X |

OTHER PUBLICATIONS

Ring, E., "Rocket Propellant and Pressurization Systems," Prentice-Hall, 1964, pp. 174, 175, 186–190.
Zucrow, M.J., "The Rocket Powerplant," SAE Journal, July, 1946, p. 377.
Sutton G. P., "Rocket Propulsion Elements," 3rd edition, John Wiley & Sons, 1963; p. 266.

*Primary Examiner*—Carlton R. Croyle
*Assistant Examiner*—Robert E. Garrett
*Attorney, Agent, or Firm*—Michael J. Striker

[57] ABSTRACT

A liquid-fueled rocket has a storage tank for the fuel components of a liquid fuel and the storage tank is able to communicate with the combustion chambers of the rocket via normally closed valves. The storage tank is enclosed and the fuel components only in part fill the latter. A body of gas is confined in the storage tank and has a pressure exceeding that in the combustion chambers. Thus, when the valves are opened, the fuel components are caused to flow from the storage tank to the combustion chambers by virtue of the difference between the pressure of the gas and the pressure in the combustion chambers.

6 Claims, 2 Drawing Figures

LIQUID-FUELED ROCKET

BACKGROUND OF THE INVENTION

The invention relates generally to liquid-fueled rockets. More particularly, the invention relates to a method and an arrangement for conveying the liquid fuel of a liquid-fueled rocket from the storage tanks of the rocket to the combustion chambers of the latter.

The fuel components of a liquid-fueled rocket, that is, the combustible component and the oxidizer constituting the liquid fuel, must be forced into the power plant of the rocket by suitable conveying means. In the known rockets of this type, this is accomplished by pumping or by pressurizing the storage tanks for the fuel components.

Various methods have been proposed and used for pressurizing the fuel components in the storage tanks. In these methods, the fuel components are subjected to the action of a pressure gas which latter is, for example, produced by a separate gas generator or a separate solid-gas generator.

The known methods have several disadvantages. The use of pumps is expensive and structurally prohibitive and, in addition, decreases the useful pay load of the rocket because of the weight of the pumps.

Where a pressure gas is used for conveying the fuel components from the storage tanks to the combustion chambers, it is necessary to provide separate containers for the fuel required to generate the pressure gas and it is also necessary to provide a gas generator. In addition, the methods using a pressure gas require an active regulating circuit for regulating the quantity of pressure gas to be introduced into the storage tanks.

In all of the known methods for conveying the fuel components via pressurization, the requisite energy for conveying the fuel components is supplied to the storage tanks from an external source. These methods are expensive and require additional fuel for generating the pressure gas as well as valves, conduits, generators and additional fuel containers. Aside from the structural and operational difficulties associated with the use of these methods, their use causes an increase in the weight of the rocket and, hence, a reduction in the useful pay load.

SUMMARY OF THE INVENTION

It is, accordingly, a general object of the invention to provide a novel method and arrangement for conveying the liquid fuel of a liquid-fueled rocket from the storage tanks of the rocket to the power plant or combustion chambers of the latter.

Another object of the invention is to provide a method and arrangement whereby the liquid fuel of a liquid-fueled rocket may be conveyed from the storage tanks of the rocket to the power plant of the latter in simple manner.

A further object of the invention is to provide a method and arrangement for conveying the liquid fuel of a liquid-fueled rocket from the storage tanks of the rocket to the power plant of the latter without significantly reducing the useful pay load of the rocket.

An additional object of the invention is to provide a method for conveying the liquid fuel of a liquid-fueled rocket from the storage tanks of the rocket to the power plant of the latter which does not require complicated and expensive equipment.

A concomitant object of the invention is to provide an arrangement for conveying the liquid fuel of a liquid-fueled rocket from the storage tanks of the rocket to the power plant of the latter which is simple in its construction and inexpensive.

In accordance with the objects outlined above and others which will become apparent hereafter, the invention provides a method of conveying the fuel components of a liquid-fueled rocket from the storage tanks to the combustion chambers of the rocket wherein fuel components to be conveyed to a combustion space are confined in an enclosed space so as to only partially fill the latter. A quantity of gas sufficient to cause the pressure of the same to exceed the pressure in the combustion space is also confined in the enclosed space. A flow path is established between the enclosed space and the combustion space and this causes the fuel components to flow from the enclosed space to the combustion space by virtue of the difference between the pressure of the gas and the pressure in the combustion space. Also disclosed is a novel arrangement for conveying the fuel components of a liquid-fueled rocket from the storage tanks to the combustion chambers of the rocket.

Thus, according to the invention, the fuel components are forced into the combustion chamber or chambers of the rocket by a gas which is confined under pressure in the same storage tank or tanks as the fuel components themselves. Suitable gases for this purpose are, for example, nitrogen, helium, air or the like.

The initial pressure of the gas, that is, the pressure of the confined gas before the fuel components have begun to flow into the combustion chambers, is dependent upon the type of power plant used for the rocket and may lie, for example, between about 5 and 100 bars. The initial pressure of the gas is favorably between about 20 and 40 bars and, advantageously, is equal to approximately 30 bars. However, the invention is not limited to the values given above. As an example, the initial pressure of the gas may be higher for a rocket which operates in the atmosphere than for a rocket which operates in vacuum.

In a suitable arrangement for carrying out the method according to the invention, at least one of the storage tanks of the rocket includes at least one portion for accommodating the gas and which is in communication with, or may be brought into communication with, the portions of the storage tank which accommodate the fuel components.

Where the storage tanks of the rocket include more than one portion for accommodating the gas, it is possible to interpose suitable valves between these portions and the initial pressure of the gas may be different in the various portions.

Advantageously, the initial volume of the gas, that is, the volume of the confined gas before the fuel components have begun to flow into the combustion chambers, amounts to approximately 20 to 50% of the total volume of the storage tanks.

The portion or portions of the storage tanks accommodating the combustible fuel component may be sealed with a membrane which tears open when the rocket begins to operate or, in other words, when the valves interposed between the storage tanks and the combustion chambers are opened.

The invention not only makes it possible to eliminate special pumps for conveying the fuel components but also makes it possible to eliminate the additional storage tanks, as well as the corresponding conduits and generators, which it would be necessary to provide for the generation of a pressure gas when using those methods wherein the fuel components are conveyed by such a gas and where additional fuel for generation of the latter is required. Furthermore, by utilizing the invention, there is no need to provide special regulating circuits for regulating the quantity of pressure gas introduced into the storage tanks so as to produce the requisite pressure in the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
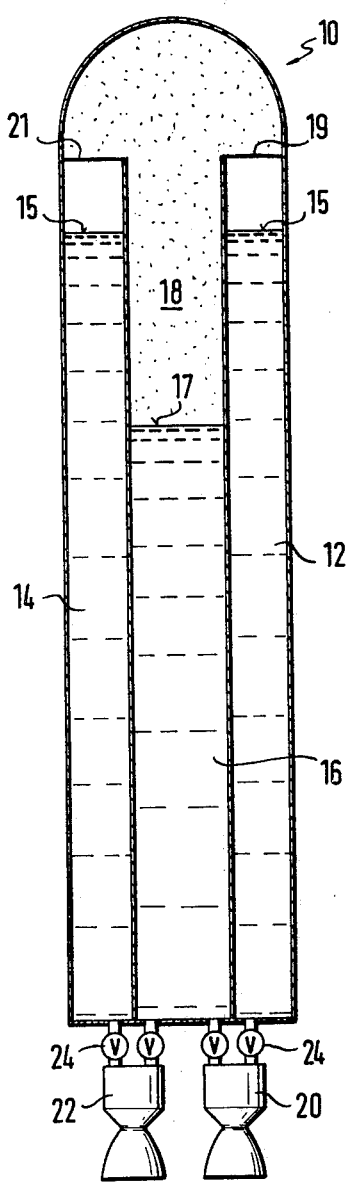
FIG. 1 is a section through a fuel storage tank of a rocket schematically illustrating an arrangement according to the invention.

Referring to FIG. 1, a storage tank or container for the liquid fuel of a liquid-fueled rocket is indicated generally at 10 and is seen to be of so-called parallel construction. The storage tank 10 includes two portions 12 and 14 for accommodating the combustible fuel component of the liquid fuel and the portions 12 and 14 extend parallel to the longitudinal axis of the storage tank 10. In the illustrated embodiment, the portions 12 and 14 are located diametrically opposite one another. However, instead of being provided with two portions for accommodating the combustible fuel component, the storage tank 10 may be provided with a plurality of such portions, for example, four portions, or may be provided with only one portion for the combustible fuel component. The portions 12 and 14 are only partially filled with the combustible fuel component, for instance, to the level indicated at 15.

The storage tank 10 includes another portion 16, 18, the part 16 of which is filled with the oxidizing fuel component or the oxidizer to the level indicated at 17, that is, the oxidizer only partially fills the portion 16, 18. The part 18 of the portion 16,18 is filled with a body of gas. It will be seen that the storage tank 10 defines an enclosed space in which the fuel components and the gas are confined.

In the illustrated embodiment, the portions 12 and 14 are closed at their upper ends with membranes 19 and 21, respectively, so that the gas in the portion 16,18 does not communicate with the combustible fuel component. However, it is also possible to eliminate these membranes so that the gas in the portion 16,18 is in direct communication with the combustible fuel component. The only purpose of the membranes 19 and 21 is to keep the combustible fuel component separated from the oxidizer during storage and when the rocket is transported. The membranes 19 and 21 may be of a thin synthetic resin foil or a synthetic resin sheet such as, for example, polyester. Below the lower end of the storage tank 10 there are located the propulsion means for the rocket including the combustion space or combustion chambers 20 and 22. Suitable valves 24 are interposed between the combustion chambers 20 and 22 and the portions 12 and 14, as well as the portion 16,18, of the storage tank 10. The valves 24 are normally closed, that is, the valves 24 will usually be closed until the rocket is to be operated, and when the valves 24 are opened a flow path is established between the combustion chambers 20 and 22 and the portions 12 and 14, as well as the portion 16,18, of the storage tank 10.

It is pointed out here that the construction and arrangement of the combustion chambers and the valves, as well as of the conduit system for introducing the fuel components into the combustion chambers, do not form part of the invention per se and, hence, are only schematically illustrated.

In operation of the embodiment of FIG. 1, the portions 12 and 14 of the storage tank 10 are filled with a combustible fuel component to the level 15 and the portion 16,18 is filled to the level 17 with an oxidizer. The part 18 of the portion 16,18 is then filled with a gas such as, for example, nitrogen, in a quantity sufficient that the gas is at a superpressure. The important consideration is that the pressure of the confined gas exceeds the pressure in the combustion chambers 20 and 22. The gas is thus in direct communication with the oxidizer and, if the membranes 19 and 21 are not used, will also be in direct communication with the combustible fuel component.

When the rocket is to be started or fired, the valves 24 are opened as a result of which the pressure in the portions 12 and 14, which are closed by the membranes 19 and 21 in the embodiment being discussed, decreases. This decrease in pressure, in conjunction with the fact that the pressure of the gas in the portion 16,18 exceeds that in the combustion chambers 20 and 22, causes the membranes 19 and 21 to tear open. The combustible fuel component and the oxidizer then flow into the combustion chambers 20 and 22 by virtue of the difference between the pressure of the gas confined in the portion 16,18 and the pressure in the combustion chambers 20 and 22.

As the fuel components flow out of the respective portions 12 and 14 and 16,18, the volume available to the confined gas increases and, as a consequence, its pressure decreases. According to the law governing the adiabatic expansion of gases, the initial pressure of the gas, that is, the pressure of the confined gas at the time that the fuel components begin to flow out of the storage tank 10, and the final pressure of the gas, that is, the pressure of the gas when the storage tank 10 has been substantially emptied, are in a ratio which is equal to the ratio of the total volume of the storage tank 10 to the initial volume of the confined gas. It will be understood that the quantity and the initial pressure of the confined gas are such as to permit the fuel components to be substantially entirely emptied from the storage tank 10.

The initial volume of the confined gas in the part 18 of the portion 16,18 may, for example, amount to about 20 to 50% of the total volume of the storage tank 10. The initial pressure of the confined gas may, for instance, lie between 20 and 40 bars and advantageously is equal to approximately 30 bars. However, the initial pressure of the confined gas is dependent upon the type of power plant with which the rocket is provided, that is, the initial pressure of the gas depends upon the size and construction of the power plant and upon the requirements imposed upon the power plant. With these considerations in mind, it is pointed out that the initial pressure of the confined gas may suitably be between about 5 and 100 bars, although the values for the initial pressure of the gas given here are not to be construed as limiting the invention in any manner.

Figure 2:
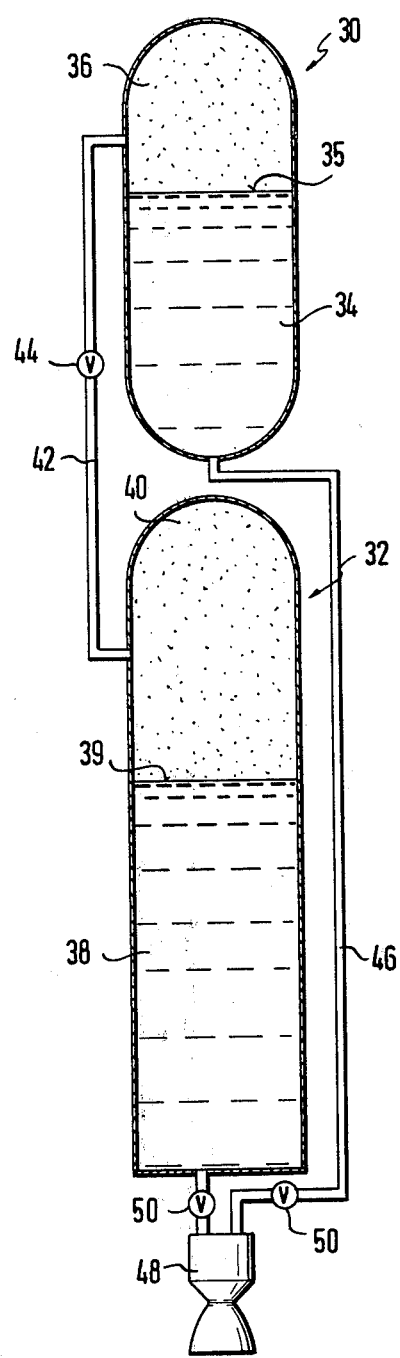
FIG. 2 is a view similar to FIG. 1 but illustrating another arrangement according to the invention.

Referring now to FIG. 2, the storage tank or container for the liquid fuel of a liquid-fueled rocket is here seen to include two sections 30 and 32 arranged in tandem. The section 30 has a portion 34 which is filled with a combustible fuel component to the level indicated at 35 and another portion 36 which is filled with a body of gas.

The section 32 has a portion 38 which is filled to the level indicated at 39 with an oxidizer, and the section 32 also has a portion 40 filled with a body of gas.

The propulsion means for the rocket is located below the section 32 and includes a combustion space or combustion chamber 48. The section 30 is connected with the combustion chamber 48 via a conduit 46. A valve 50 is provided in the conduit 46 as well as in the conduit connecting the section 32 with the combustion chamber 48. The valves 50 are normally closed until the rocket is to be started. It will be appreciated that the sections 30 and 32 define an enclosed space in which the fuel components and the gas are confined.

Again, the construction and arrangement of the combustion chamber, the valves and the conduit system for conveying the fuel components from the storage tank to the combustion chamber do not form part of the invention per se and are not, therefore, illustrated in detail.

In operation of the embodiment shown in FIG. 2, the sections 30 and 32 are respectively filled with a combustible fuel component and an oxidizer to the respective levels 35 and 39, that is, the fuel components only partially fill the sections 30 and 32. The portions 36 and 40 of the sections 30 and 32, respectively, are then filled with a gas the quantity of which is sufficient in each instance to raise the pressure of the gas in each of the sections 30 and 32 to a value which exceeds the value of the pressure in the combustion chamber 48.

When the rocket is to be started or fired, the valves 50 are opened whereupon the fuel components are forced into the combustion chamber 48 by virtue of the difference between the pressure of the confined gas in the respective sections 30 and 32 and the pressure in the combustion chamber 48. The initial pressure of the gas in the section 30 may be different from that of the gas in the section 32 and, in the illustrated tandem construction, the initial pressure of the gas in the section 30 is advantageously lower than that of the gas in the section 32 in order to provide compensation for the greater hydrostatic pressure head of the fuel component in the section 30 as opposed to the lower hydrostatic pressure head of the fuel component in the section 32, i.e. in order to provide an equalization of pressure. (The hydrostatic pressure head in the section 32 falls off to substantially zero which, with regard to the section 30, is not the case because of the presence of the conduit 46 which latter is usually not completely emptied). It will be understood that the quantity and initial pressure of the gas in the respective sections 30 and 32 are such as to permit the fuel components to be substantially completely emptied therefrom.

In many circumstances, the sections 30 and 32 may be connected by a conduit 42 so as to permit an equalization of the pressures in the sections 30 and 32 through the conduit 42. Advantageously, the conduit 42 is provided with a valve 44.

If desired, the initial volume of the gas in the section 30 and the initial volume of the gas in the section 32 may be so selected that the ratio of the initial volume of the gas in the section 30 to the total volume of the section 30 equals the ratio of the initial volume of the gas in the section 32 to the total volume of the section 32.

By utilizing the invention, the total energy required for conveying the fuel components to the combustion chamber or chambers is already stored, in form of the compression of the gas, before the rocket is started or fired and, therefore, this energy need not be supplied to the storage tank or tanks from an external source. This manner of conveying the fuel components, that is, conveying the fuel components without introducing a gas or supplying energy to the storage tanks from externally, is structurally simpler and also cheaper than the conveying methods used for rockets heretofore. Furthermore, the entire operation is considerably more reliable when using the invention since there is no need to provide active regulating elements such as, for example, pressure reducing valves or gas generators. Such reliability is, of course, of great importance in rockets.

It will be understood that each of the elements described above, or two or more together, may also find a useful application in other types of construction and operations differing from the types described above.

While the invention has been illustrated and described as embodied in a liquid-fueled rocket, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

I claim:

1. In a liquid-fueled rocket, a combination comprising propulsion means including a combustion chamber; enclosed container means for accommodating the fuel components of a liquid fuel and including two container portions; a membrane separating said portions; normally closed valve means interposed between said combustion chamber and said container means; fuel components of a liquid fuel in said container means and only in part filling the same, one of said fuel components being accommodated in one of said container portions and another of said fuel components being accommodated in the other of said container portions; and a body of gas confined in said container means in one of said container portions only and having a pressure in excess of the pressure in said combustion chamber so that when said valve means is opened the pressure differential due to the difference between the pressure of said gas and the pressure in said combustion chamber causes tearing of said membrane and flow of the fuel components from both of said container portions into said combustion chamber.

2. In a rocket as defined in claim 1, wherein the gas confined in said container means comprising a single body of gas.

3. In a rocket as defined in claim 1, wherein said gas comprises a gas selected from the group consisting of nitrogen, helium and air.

4. In a rocket as defined in claim 1, wherein said pressure of said gas is between substantially 20 and 40 bars.

5. In a rocket as defined in claim 4, wherein said pressure of said gas is about 30 bars.

6. In a rocket as defined in claim 1, said container means having a predetermined volume; and wherein the volume of said gas amounts to substantially 20 to 50% of said predetermined volume.

* * * * *